US012263536B2

(12) United States Patent
Shin et al.

(10) Patent No.: US 12,263,536 B2
(45) Date of Patent: Apr. 1, 2025

(54) SECONDARY BATTERY AND METHOD FOR MANUFACTURING SAME

(71) Applicant: Samsung SDI Co., Ltd., Yongin-si (KR)

(72) Inventors: Ho Jun Shin, Yongin-si (KR); Sang Won Byun, Yongin-si (KR); Young Sik Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 858 days.

(21) Appl. No.: 17/298,485

(22) PCT Filed: Jan. 3, 2020

(86) PCT No.: PCT/KR2020/000101
§ 371 (c)(1),
(2) Date: May 28, 2021

(87) PCT Pub. No.: WO2020/171372
PCT Pub. Date: Aug. 27, 2020

(65) Prior Publication Data
US 2022/0029253 A1   Jan. 27, 2022

(30) Foreign Application Priority Data

Feb. 21, 2019   (KR) .................. 10-2019-0020454

(51) Int. Cl.
*H01M 50/543* (2021.01)
*B23K 26/21* (2014.01)
(Continued)

(52) U.S. Cl.
CPC ........... *B23K 26/21* (2015.10); *H01M 50/103* (2021.01); *H01M 50/533* (2021.01);
(Continued)

(58) Field of Classification Search
CPC .. B23K 26/21; B23K 26/244; B23K 2101/38; H01M 50/103; H01M 50/533;
(Continued)

(56) References Cited

U.S. PATENT DOCUMENTS 8,603,193 B2   12/2013   Kondou et al.
8,815,430 B2   8/2014   Okabe et al.
(Continued)

FOREIGN PATENT DOCUMENTS

CN   101048893 A   10/2007
CN   102918680 A   2/2013
(Continued)

OTHER PUBLICATIONS

Aalco, Aluminum Allow 1050'O' Sheet, updated 2020.*
(Continued)

*Primary Examiner* — Helen Oi K Conley
(74) *Attorney, Agent, or Firm* — Womble Bond Dickinson (US) LLP

(57) ABSTRACT

The present invention relates to a secondary battery and a method for manufacturing same, and the technical problem to be solved is to prevent damage due to fatigue loading that may occur during ultrasonic welding between an electrode tab and an auxiliary tab, by strongly laser welding between the auxiliary tab and a current collecting portion of a single plate. To this end, disclosed is a secondary battery and a method for manufacturing same, wherein the secondary battery comprises: an electrode assembly having an electrode tab; an auxiliary tab which is a metal single plate mechanically and electrically coupled to the electrode tab; and a current collecting portion which is mechanically and electrically coupled to the auxiliary tab, wherein the auxiliary tab comprises: a tab connection portion welded to the electrode tab; a current collecting connection portion welded (Continued)

to the current collecting portion and disposed parallel to the tab connection portion; and a bending portion which connects between the tab connection portion and the current collecting connection portion and surrounds one side of the current collecting portion.

17 Claims, 6 Drawing Sheets

(51) Int. Cl.
*H01M 50/103* (2021.01)
*H01M 50/533* (2021.01)
*H01M 50/534* (2021.01)
*H01M 50/536* (2021.01)
*H01M 50/54* (2021.01)

(52) U.S. Cl.
CPC ....... *H01M 50/534* (2021.01); *H01M 50/536* (2021.01); *H01M 50/54* (2021.01); *H01M 50/543* (2021.01)

(58) Field of Classification Search
CPC .. H01M 50/534; H01M 50/536; H01M 50/54; H01M 50/543; H01M 50/342; H01M 50/55; H01M 50/531; Y02E 60/10
See application file for complete search history.

(56) References Cited

U.S. PATENT DOCUMENTS

| | | |
|---|---|---|
| 8,956,755 B2 | 2/2015 | Kurata et al. |
| 9,287,550 B2 | 3/2016 | Kim et al. |
| 2008/0038629 A1 | 2/2008 | Okabe et al. |
| 2010/0223780 A1 | 9/2010 | Kondou et al. |
| 2011/0052976 A1 | 3/2011 | Ishii et al. |
| 2013/0130100 A1 | 5/2013 | Kurata et al. |
| 2013/0330593 A1 | 12/2013 | Kim et al. |
| 2014/0030562 A1 | 1/2014 | Ishii et al. |
| 2015/0214513 A1 | 7/2015 | Ishii et al. |
| 2015/0221926 A1 | 8/2015 | Yoshitake et al. |
| 2019/0013506 A1 | 1/2019 | Park |
| 2019/0067667 A1 | 2/2019 | Jang et al. |
| 2019/0319295 A1 | 10/2019 | Kim et al. |

FOREIGN PATENT DOCUMENTS

| | | |
|---|---|---|
| DE | 112013004445 | 6/2015 |
| EP | 3451417 A1 | 3/2019 |
| JP | 2017-117739 A | 6/2017 |
| KR | 10-2010-0100657 A | 9/2010 |
| KR | 10-2013-0042954 A | 4/2013 |
| KR | 10-2013-0138678 A | 12/2013 |
| KR | 10-2017-0121988 A | 11/2017 |
| KR | 10-2018-0044088 A | 5/2018 |
| KR | 10-2018-0060831 A | 6/2018 |
| KR | 10-2018-0061681 A | 6/2018 |
| KR | 10-2018-0101034 A | 9/2018 |
| WO | WO 2018/101634 A1 | 6/2018 |
| WO | 2018/199439 A1 | 11/2018 |

OTHER PUBLICATIONS https://www.makeitfrom.com/material-properties/1050-A91050-Aluminum, 2020.*
International Search Report for corresponding International Application No. PCT/KR2020/000101, dated Apr. 10, 2020, 4pp.
Chinese Office Action, with English translation, dated Sep. 28, 2022, issued in corresponding Chinese Patent Application No. 202080007297.8 (18 pages).
European Search Report for EP Application No. 20758497.3 dated Feb. 21, 2023, 7 pages.

* cited by examiner

SECONDARY BATTERY AND METHOD FOR MANUFACTURING SAME

CROSS-REFERENCE TO RELATED APPLICATIONS

This application is a U.S. National Phase Patent Application of International Application Number PCT/KR2020/000101, filed on Jan. 3, 2020, which claims priority to Korean Patent Application Number 10-2019-0020454, filed on Feb. 21, 2019, the entire content of both of which is incorporated herein by reference.

TECHNICAL FIELD

Various embodiments of the present invention relate to a secondary battery and a method for manufacturing same.

BACKGROUND ART

Unlike primary batteries, secondary batteries are rechargeable. Of these secondary batteries, a low capacity battery including a battery cell in the form of a pack may be used in small portable electronic devices, such as cellular phones or camcorders, while a high capacity battery including tens of battery cells connected to one another may be used as a power source for driving a motor, e.g., for electric scooters, hybrid vehicles, or electric vehicles.

A secondary battery is configured by accommodating an electrode assembly, which may be formed by arranging a separator as an insulator between a positive electrode plate and a negative electrode plate, in a case together with an electrolytic solution and installing a cap plate onto the case. As one example, an electrode assembly may be formed in a jelly-roll configuration. The jelly-roll electrode assembly is configured such that a main tab (e.g., an uncoated portion of the positive or negative plate) protrudes upwardly from the electrode assembly or from left and right sides of the electrode assembly and a current collecting portion is connected to the main tab or the uncoated portion.

The above information disclosed in this Background section is only for enhancement of understanding of the background of the invention and therefore it may contain information that does not form the prior art that is already known in this country to a person of ordinary skill in the art.

DESCRIPTION OF EMBODIMENTS

Technical Problem

An objective of the present invention is to provide a secondary battery, in which an auxiliary tab as a single plate and a current collecting portion are strongly laser-welded, thereby preventing damage due to fatigue loading that may be generated during ultrasonic welding between an electrode tab and the auxiliary tab, and a method for manufacturing same.

Another objective of the present invention is to provide a secondary battery, in which an electrode tab and an auxiliary tab are welded by using a flexible rigid material in the auxiliary tab, thereby preventing a welded portion from being broken during bending after the electrode tab and the auxiliary tab are welded to each other, and a method for manufacturing same.

Solution to Problem

In a secondary battery and a method for manufacturing same, according to the present invention, the secondary battery may include an electrode assembly having an electrode tab, an auxiliary tab which is a metal single plate mechanically and electrically coupled to the electrode tab, and a current collecting portion which is mechanically and electrically coupled to the auxiliary tab, wherein the auxiliary tab comprises: a tab connection portion welded to the electrode tab, a current collecting connection portion welded to the current collecting portion and disposed parallel to the tab connection portion, and a bending portion which connects between the tab connection portion and the current collecting connection portion and surrounds one side of the current collecting portion.

The current collecting connection portion may have a laser welding portion coupled to the current collecting portion by laser welding.

The laser welding portion may include a linear welding portion shaped of a straight line, spaced a predetermined distance apart from the bending portion, and a circular welding portion shaped of a circle, having an end portion overlapped with the linear welding portion.

When the electrode tab has at least a thickness of about 0.4 mm to about 0.5 mm, the linear welding portion may be spaced at least a distance of about 0.8 mm to about 1.2 mm apart from the bending portion.

When the electrode tab has at least a thickness of about 0.5 mm to about 0.7 mm, the linear welding portion may be spaced at least a distance of about 1.2 mm to about 1.8 mm apart from the bending portion.

A length of the linear welding portion may be larger than that of the current collecting connection portion, and start and end points of the linear welding portion may be positioned in the current collecting portion.

The laser welding portion may be a circular welding portion shaped of a circle, spaced at least a distance of about 1.5 mm to about 1.8 mm apart from the bending portion.

The auxiliary tab may be made of 1050-O aluminum or 1100-O copper having high stiffness and elongation.

According to another aspect, provided is a method for manufacturing a secondary battery, comprising the steps of: preparing an auxiliary tab having a tab connection portion and a current collecting connection portion at opposite sides of a bending portion by bending the auxiliary tab as a flat rectangular single plate by 90 degrees; performing laser welding in a state in which an inner surface of the current collecting connection portion is in contact with an inner surface of the current collecting portion; ultrasonic-welding the tab connection portion to an electrode tab of an electrode assembly; and bending the tab connection portion and the electrode tab so as to be brought into contact with an outer surface of the current collecting portion.

In the step of performing laser welding, a linear welding portion shaped of a straight line, spaced at least a distance of about 0.8 mm to about 1.8 mm apart from the bending portion, and a circular welding portion shaped of a circle, having an end portion overlapped with the linear welding portion, may be formed.

Advantageous Effects of Disclosure

As described above, in the secondary battery and the method for manufacturing same, an auxiliary tab as a single plate and a current collecting portion are strongly laser-welded, thereby preventing damage due to fatigue loading that may be generated during ultrasonic welding between an electrode tab and the auxiliary tab.

In addition, in the secondary battery and the method for manufacturing same, an electrode tab and an auxiliary tab are welded by using a flexible rigid material in the auxiliary tab, thereby preventing a welded portion from being broken during bending after the electrode tab and the auxiliary tab are welded to each other.

BEST MODE

Figure 1:
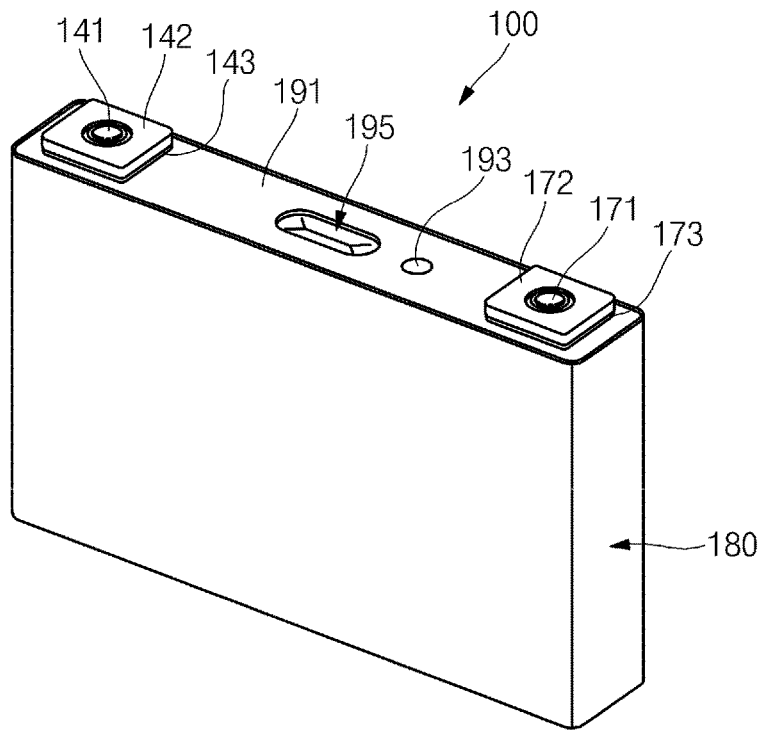
FIG. 1 is a perspective view illustrating a secondary battery according to various embodiments of the present invention.

Example embodiments will now be described more fully with reference to the accompanying drawings.

The present invention may be embodied in different forms and should not be construed as limited to the embodiments set forth herein. Rather, these embodiments are provided so that this disclosure will be thorough and complete, and will fully convey the scope of the invention to those skilled in the art.

In the drawings, the thickness of layers, films, panels, regions, etc., are exaggerated for clarity. Like reference numerals designate like elements throughout the specification. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

It will be understood that, although the terms first, second, third etc. may be used herein to describe various elements, components, regions, layers and/or sections, these elements, components, regions, layers and/or sections, should not be limited by these terms. These terms are only used to distinguish one element component, region, layer and/or section, from another. Thus, a first element, component, region, layer and/or section, discussed below could be termed a second element, component, region, layer and/or section, without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Figure 2A:
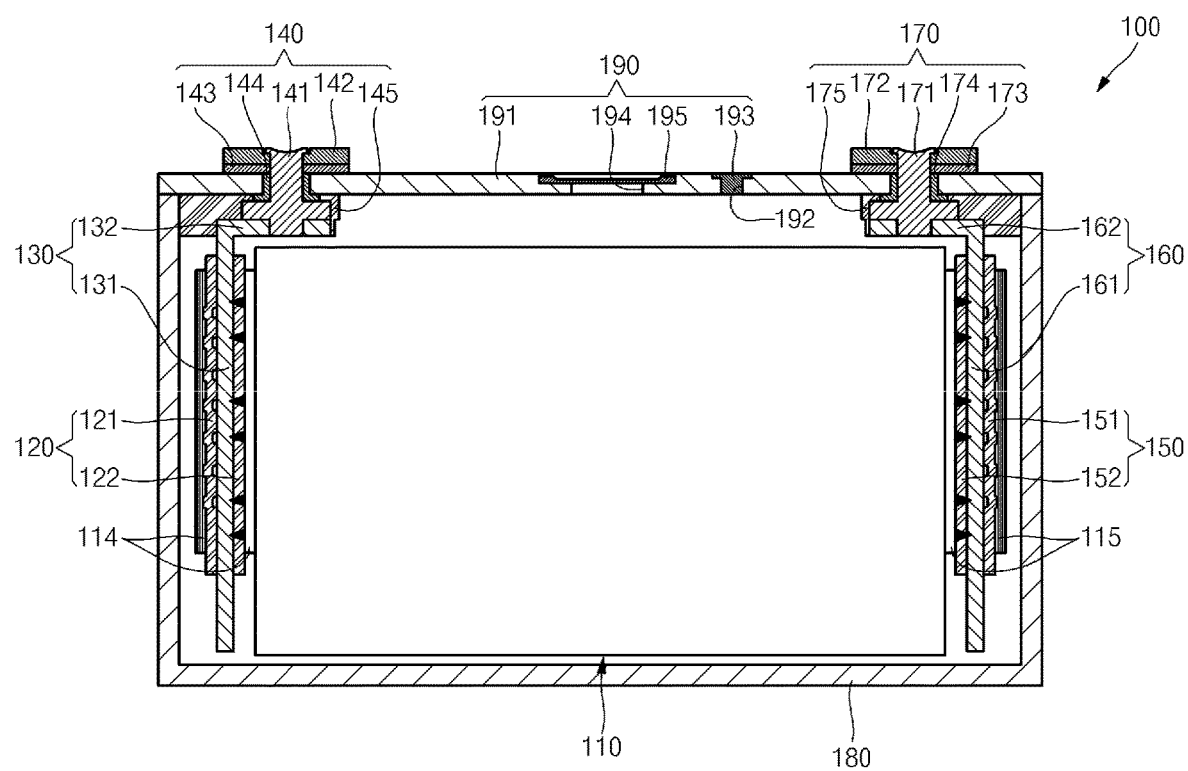
FIGS. 2A and 2B are a longitudinal view and a cross-sectional view of the secondary battery shown in FIG. 1.
Figure 2B:
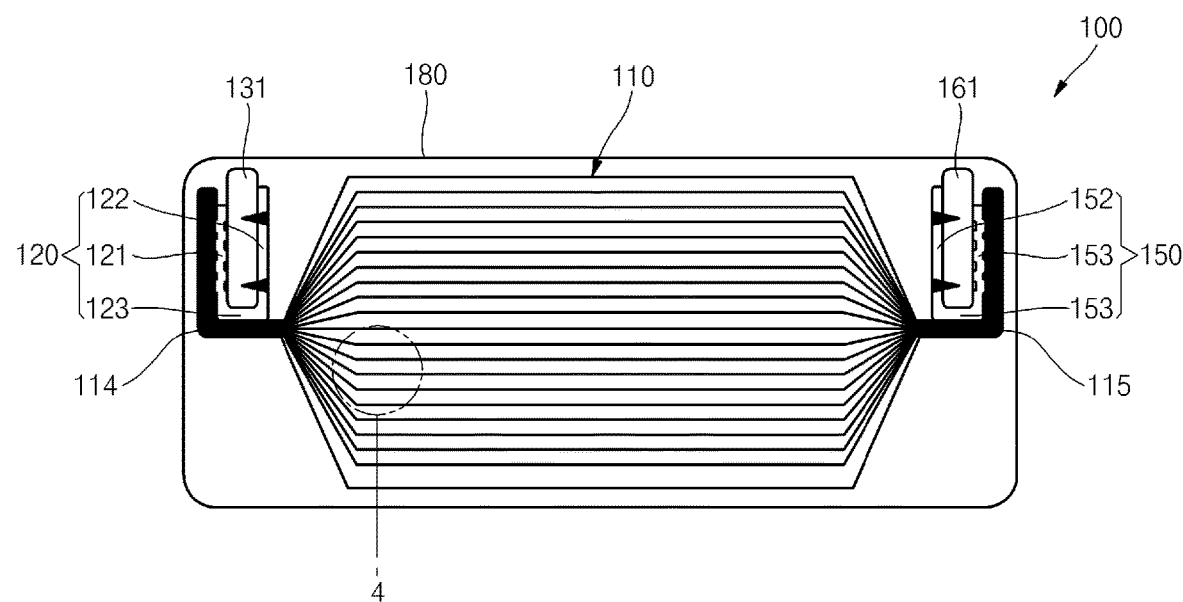

Referring to FIG. 1, a perspective view illustrating a secondary battery according to various embodiments of the present invention is illustrated. Referring to FIGS. 2A and 2B, a longitudinal view and a cross-sectional view of the secondary battery shown in FIG. 1 are illustrated.

Referring to FIGS. 1, 2A and 2B, the secondary battery 100 according to the present invention includes a stack-type electrode assembly 110, a first auxiliary tab 120 electrically connected to one side (e.g., a first electrode tab 114) of the electrode assembly 110, a first current collecting portion 130 electrically connected to a first auxiliary tab 120, a first terminal portion 140 electrically connected to the first current collecting portion 130, a second auxiliary tab 150 electrically connected to the other side (e.g., a second electrode tab 115) of the electrode assembly 110, a second current collecting portion 160 electrically connected to the second auxiliary tab 150, a second terminal portion 170 electrically connected to the second current collecting portion 160, a case 180 accommodating the electrode assembly 110, and a cap assembly 190 coupled to an opening of the case 180.

The secondary battery 100 according to an embodiment of the present invention will now be described by way of example with respect to a lithium ion secondary battery having a prismatic shape. However, the present invention is not limited thereto and may be applied to various types of batteries, including, a lithium polymer battery.

Figure 3:
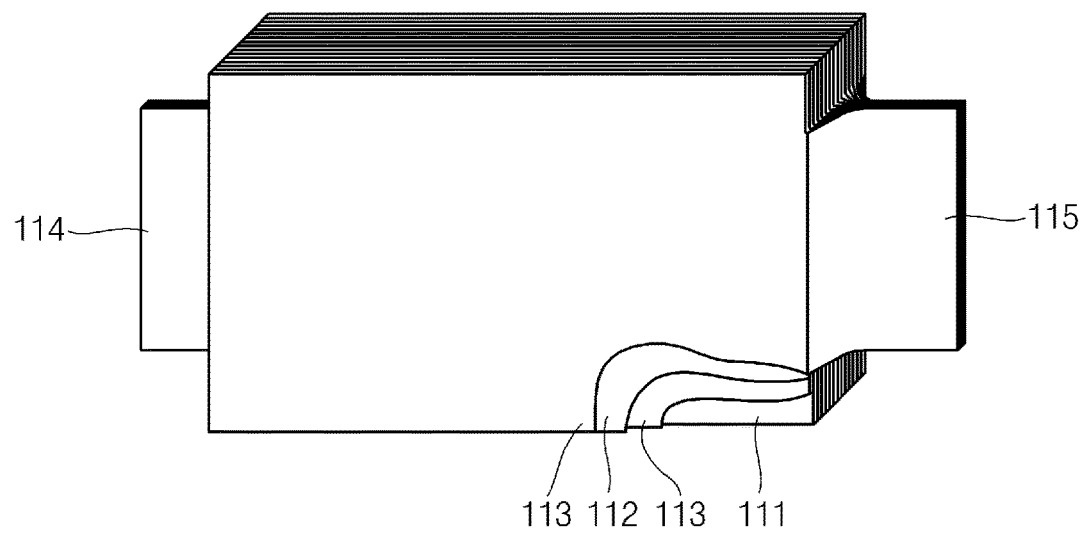
FIG. 3 is a perspective view illustrating an electrode assembly in a secondary battery according to various embodiments of the present invention.
Figure 4:
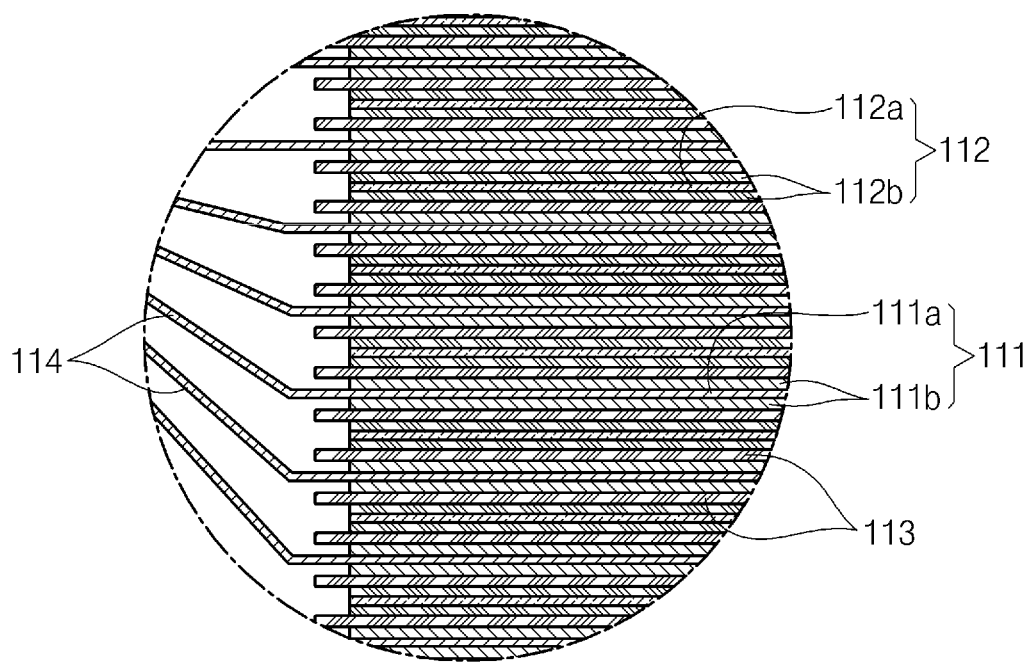
FIG. 4 is an enlarged view of a portion A of FIG. 2B.

The electrode assembly 110 may include a stacked structure including a first electrode plate 111, a second electrode plate 112, and a separator 113 interposed between the first and second electrode plates 111 and 112. Referring to FIG. 3, a perspective view of the electrode assembly 110 is shown, and referring to FIG. 4, an enlarged view of the electrode assembly 110 illustrating a portion 4 of FIG. 2B, is shown. Hereinafter, a configuration of the electrode assembly 110 will be described with reference to FIGS. 3 and 4.

The electrode assembly 110 includes the first electrode tab 114 and the second electrode tab 115 respectively protruding to opposite sides from a rectangular parallelepiped structure in which the first electrode plate 111 having a substantially rectangular shape, the separator 113 having a rectangular shape, and the second electrode plate 112 having a substantially rectangular shape, are sequentially stacked, rather than from a structure wound in a jelly-roll configuration. The first electrode tab 114 and the second electrode tab 115 may have a thickness of about 0.4 mm to about 0.7 mm.

Here, the first electrode plate 111 may operate as a negative electrode, and the second electrode plate 112 may operate as a positive electrode. Conversely, the first electrode plate 111 may operate as a positive electrode, and the second electrode plate 112 may operate as a negative electrode. However, for the sake of convenient explanation, the present invention will be described by way of example with regard to a case in which the first electrode plate 111 operates as a negative electrode, and the second electrode plate 112 operates as a positive electrode.

The first electrode plate 111 may be formed by applying a first electrode active material 111b, such as graphite or carbon, to a first electrode current collector 111a formed of a metal foil, such as copper, a copper alloy, nickel or a nickel alloy, and may include the first electrode tab 114 (or a first uncoated portion) which is an area to which the first electrode active material is not applied. The first electrode tab 114 is a passage of a current flow between the first electrode plate 111 and the first auxiliary tab 120.

As shown in FIG. 2B, the first electrode tab 114 may protrude/extend to one side from the electrode assembly 110 by a predetermined length and may be bent in an approximately "L" shape. In particular, the first electrode tab 114 may be bent in an "L" shape after being welded to the first auxiliary tab 120. That is, the first electrode tab 114 of the electrode assembly 110 is approximately parallel to the first electrode plate 111 at an initial stage, but may be bent in an "L" shape so as to be approximately parallel to one surface of the first current collecting portion 130, once the first electrode tab 114 is coupled to the first auxiliary tab by welding. Here, the first electrode tab 114 may be coupled by ultrasonic welding in a state in which it is overlapped with the first auxiliary tab 120.

The second electrode plate 112 may be formed by applying a second electrode active material 112b, such as a transition metal oxide, to a second electrode current collector 112a formed of a metal foil, such as aluminum or an aluminum alloy, and the second electrode tab 115 (or a second uncoated portion), which is an area in which the second electrode active material (112b) is not applied. The second electrode tab 115 is a passage of current flow between the second electrode plate 112 and the second auxiliary tab 150.

As shown in FIG. 2B, the first electrode tab 114 may protrude/extend to one side from the electrode assembly 110 by a predetermined length and may be bent in an approximately "L" shape. In particular, the first electrode tab 114 may be bent in an "L" shape after being welded to the first auxiliary tab 120. That is, the first electrode tab 114 of the electrode assembly 110 is approximately parallel to the first electrode plate 111 at an initial stage, but may be bent in an "L" shape so as to be approximately parallel to one surface of the first current collecting portion 130, once the first electrode tab 114 is coupled to the first auxiliary tab by welding. Here, the first electrode tab 114 may be coupled by ultrasonic welding in a state in which it is overlapped with the first auxiliary tab 120.

Like the first electrode tab 114, the second electrode tab 115 may protrude/extend to the other side from the electrode assembly 110 by a predetermined length and may be bent in an approximately "L" shape. In particular, the second electrode tab 115 may be bent in an "L" shape after being welded to the second auxiliary tab 150. That is, the second electrode tab 115 of the electrode assembly 110 is approximately parallel to the second electrode plate 112 at an initial stage, but may be bent in an "L" shape so as to be approximately parallel to one surface of the second current collecting portion 160, once the second electrode tab 115 is coupled to the second auxiliary tab 150 by welding. Here, the second electrode tab 115 may be coupled by ultrasonic welding in a state in which it is overlapped with the second auxiliary tab 150.

In addition, the first electrode tab 114 and the second electrode tab 115 are configured to protrude/extend in a predetermined length in opposite directions which are parallel with the electrode assembly 110.

The separator 113, positioned between the first electrode plate 111 and the second electrode plate 112, may prevent a short circuit therebetween, and may enable the movement of lithium ions. In addition, the separator 113 may be made of polyethylene, polypropylene, or a composite film of polyethylene and polypropylene, but the present invention does not limit the material of the separator 113 thereto. In some cases, the separator 113 may be replaced by a solid electrolyte.

For example, the electrode assembly 110 may be accommodated in the case 180 with an electrolytic solution, but not limited thereto. The electrolytic solution can be composed of a lithium salt, such as, for example, an organic solvent such as EC, PC, DEC, EMC, and DMC. In addition, the electrolytic solution may be a liquid, a solid, or a gel.

The first auxiliary tab 120 may include a first tab connection portion 121 electrically and mechanically connected to the first electrode tab 114, a first current collecting connection portion 122 electrically and mechanically connected to the first current collecting portion 130, and a first bending portion 123 connecting the first tab connection portion 121 with the first current collecting connection portion 122. The first auxiliary tab 120 may be formed by bending a flat single plate. The first tab connection portion 121 and the first current collecting connection portion 122 may become parallel with each other by means of the first bending portion 123. The first tab connection portion 121 may be positioned between the first electrode tab 114 and the first current collecting portion 130, and the first current collecting connection portion 122 may be positioned between the first current collecting portion 130 and one side surface of the electrode assembly 110. The first auxiliary tab 120 may be a metal single plate.

In a state in which the first auxiliary tab 120 is bent in an "L" shape, the first current collecting connection portion 122 provided at one side of the first auxiliary tab 120 may first be welded to the first current collecting portion 130, and the first tab connection portion 121 provided at the other side thereof may then be welded to the first electrode tab 114. After the first auxiliary tab 120 is welded to the first electrode tab 114, the first bending portion 123 may be bent in a "U" shape so as to be substantially parallel to one surface of the first current collecting portion 130 together with the first electrode tab 114. That is, since the first auxiliary tab 120 should be bent in the "U" shape during the manufacturing process of the secondary battery 100, a flexible material may be used for the first auxiliary tab 120. To this end, the first auxiliary tab 120 may have a smaller thickness than the first current collecting portion 130. Preferably, the first auxiliary tab 120 may be made of 1050-O aluminum having high stiffness and elongation, and the thickness thereof may be about 0.3 mm. As indicated in Table 1, when the first auxiliary tab 120 is made of 0.3 mm thick 1050-O-aluminum, plastic strains of the first auxiliary tab 120 are both within ranges of reference elongation rates of all materials in cases of bending the first auxiliary tab 120 by 90 degrees and 180 degrees, suggesting that local ruptures or damage are not generated.

TABLE 1

| | Plastic strain | | Reference elongation rate | | |
|---|---|---|---|---|---|
| Thickness | 90 degrees (%) | 180 degrees (%) | Damage (%) | Local rupture (%) | Assessment |
| 0.3 t | 32 | 32 | <35 | <56.6 | OK |

The first auxiliary tab 120 may be ultrasonically welded to the first electrode tab 114. Welding between the first auxiliary tab 120 and the first current collecting portion 130, and welding between the first auxiliary tab 120 and the first electrode tab 114 will be described below in further details.

The first current collecting portion 130 includes a first electrode connection portion 131 electrically and mechanically connected to the first auxiliary tab 120, and a first terminal connection portion 132 bent and extended from a top end of the first electrode connection portion 131 and electrically and mechanically connected to the first terminal portion 140.

The first electrode connection portion 131 is brought into contact with and coupled to the first auxiliary tab 120 to then be electrically connected to the first electrode tab 114 of the electrode assembly 110. The first electrode connection portion 131 is welded to the first auxiliary tab 120 and has a vertically standing shape. The first electrode connection portion 131 may be coupled to the first auxiliary tab 120 by laser welding. The welding between the first electrode connection portion 131 and the first auxiliary tab 120 will be described below in further details.

The first terminal connection portion 132 is coupled to the first terminal portion 140 in a plate shape lying in a horizontal direction so as to be parallel to a cap plate 191. The first terminal connection portion 132 may be welded to the first terminal portion 140 and may be positioned between the cap plate 191 of a cap assembly 190, which will later be described, and the electrode assembly 110. The first terminal connection portion 132 may be perpendicular to the top end of the first electrode connection portion 131.

The first auxiliary tab 120, the first current collecting portion 130 and the first electrode tab 114 may be made of the same material. Preferably, if the first electrode tab 114 is made of copper, the first auxiliary tab 120 and the first current collecting portion 130 may also be made of a copper-based material.

The first terminal portion 140 is electrically connected to the first electrode tab 114 of the electrode assembly 110 through the first current collecting portion 130 and the first auxiliary tab 120. Here, the first terminal portion 140 may include a first terminal pillar 141 passing through the cap plate 191 of the cap assembly 190, and the first electrode connection portion 131 of the first current collecting portion 130 is electrically to the first terminal pillar 141 inside the case 180. Moreover, the first auxiliary tab 120 is connected to the first current collecting portion 130, and the first electrode tab 114 of the electrode assembly 110 is then electrically to the first auxiliary tab 120. In addition, the first terminal portion 140 is positioned on the cap plate 191, and may include a first terminal plate 142 (made of, for example, aluminum) coupled to the first terminal pillar 141, a first terminal upper insulating member 143 installed between the first terminal plate 142 and the cap plate 191, a first terminal seal gasket 144 positioned between the first terminal pillar 141 and the cap plate 191, and a first terminal lower insulating member 145 installed between the first current collecting portion 130 connected to the first terminal pillar 141 and the cap plate 191.

In addition, it will be understood by those skilled in the art that the first terminal portion 140 is merely provided as an example for understanding one or more embodiments of the present invention and that the first terminal portion 140 may be modified in various types/structures.

The second auxiliary tab 150 may include a second tab connection portion 151 electrically and mechanically connected to the second electrode tab 115, a second current collecting connection portion 152 electrically and mechanically connected to the second current collecting portion 160, and a second bending portion 153 connecting the second tab connection portion 151 to the second current collecting connection portion 152. The second auxiliary tab 150 may be formed by bending a flat single plate. The second tab connection portion 151 and the second current collecting connection portion 152 may become parallel with each other by means of the second bending portion 152. The second tab connection portion 151 may be positioned between the second electrode tab 115 and the second current collecting portion 160, and the second current collecting connection portion 152 may be positioned between the second current collecting portion 160 and one side surface of the electrode assembly 110. The second auxiliary tab 150 may be a metal single plate.

In a state in which the second auxiliary tab 150 is bent in an "L" shape, the second current collecting connection portion 152 provided at one side of the second auxiliary tab 150 may first be welded to the second current collecting portion 160, and the second tab connection portion 151 provided at the other side thereof may then be welded to the second electrode tab 115. After the second auxiliary tab 150 is welded to the second electrode tab 115, the second bending portion 153 may be bent in a "U" shape so as to be substantially parallel to one surface of the second current collecting portion 160 together with the second electrode tab 115. That is, since the second auxiliary tab 150 should be bent in the "U" shape during the manufacturing process of the secondary battery 100, a flexible material may be used for the second auxiliary tab 150. To this end, the second auxiliary tab 150 may have a smaller thickness than the second current collecting portion 160.

Preferably, the second auxiliary tab 150 may be made of 1100-O copper having high stiffness and elongation, and the thickness thereof may be about 0.2 mm. As indicated in Table 2, when the second auxiliary tab 150 is made of 0.2 mm thick 1100-O copper, plastic strains of the second auxiliary tab 150 are both within ranges of reference elongation rates of all materials in cases of bending the second auxiliary tab 150 by 90 degrees and 180 degrees, suggesting that local ruptures or damage are not generated.

TABLE 2

| | Plastic strain | | Reference elongation rate | | |
|---|---|---|---|---|---|
| Thickness | 90 degrees (%) | 180 degrees (%) | Damage (%) | Local rupture (%) | Assessment |
| 0.2 t | 17 | 17 | <32.1 | <49.6 | OK |

The second auxiliary tab 150 may be laser-welded to the second current collecting portion 160 and may be ultrasonically welded to the second electrode tab 115.

The second current collecting portion 160 may include a second electrode connection portion 161 electrically and mechanically connected to the second auxiliary tab 150, and a second terminal connection portion 152 bent and extended from a top end of the second electrode connection portion 161 and electrically and mechanically connected to the second terminal portion 150.

The second electrode connection portion 161 is brought into contact with and coupled to the second auxiliary tab 150 to then be electrically connected to the second electrode tab 115 of the electrode assembly 110. The second electrode connection portion 161 is welded to the second auxiliary tab 150 and has a vertically standing shape. The second electrode connection portion 161 may be coupled to the second auxiliary tab 150 by laser welding.

The second terminal connection portion 162 is coupled to the second terminal portion 160 in a plate shape lying in a horizontal direction so as to be parallel to the cap plate 191. The second terminal connection portion 162 may be welded to the second terminal portion 160, and may be positioned between the cap plate 191 of the cap assembly 190, which will later be described, and the electrode assembly 110. The second terminal connection portion 162 may be perpendicular to the top end of the second electrode connection portion 161.

The second auxiliary tab 150, the second current collecting portion 160 and the second electrode tab 115 may be made of the same material. Preferably, if the second electrode tab 115 is made of aluminum, the second auxiliary tab 150 and the second current collecting portion 160 may also be made of an aluminum-based material.

The second terminal portion 170 is electrically connected to the second electrode tab 115 of the electrode assembly 110 through the second current collecting portion 160 and the second auxiliary tab 150. Here, the second terminal portion 170 may include a second terminal pillar 171 passing through the cap plate 191 of the cap assembly 190, and the second electrode connection portion 161 of the second current collecting portion 160 is electrically to the second terminal pillar 171 inside the case 180. Moreover, the second auxiliary tab 150 is connected to the second current collecting portion 160, and the second electrode tab 115 of the electrode assembly 110 is then electrically to the second auxiliary tab 150.

In addition, the second terminal portion 170 is positioned on the cap plate 191, and may include a second terminal plate 172 (made of, for example, aluminum) coupled to the second terminal pillar 171, a second terminal upper insulating member 173 installed between the first terminal plate 132 and the cap plate 191, a second terminal seal gasket 174 positioned between the second terminal pillar 171 and the cap plate 191, and a second terminal lower insulating member 175 installed between the second current collecting portion 170 connected to the second terminal pillar 171 and the cap plate 191.

Here, the second terminal upper insulating member 173 may be replaced by a high resistance conductor. In this case, the cap plate 191 and the case 180 may have the same polarity as the second terminal portion 170. That is, the case 180 and the cap plate 191 may be positively charged in the secondary battery 100.

In addition, it will be understood by those skilled in the art that the second terminal portion 170 is merely provided as an example for understanding one or more embodiments of the present invention and that the second terminal portion 170 may be modified in various types/structures.

The case 180 may be shaped of a substantially rectangular parallelepiped having an opening formed at an upper portion thereof. The electrode assembly 110 may be inserted into the interior of the case 180 through the opening. In addition, the first auxiliary tab 120, the first current collecting portion 130, the second auxiliary tab 150, and the second current collecting portion 160 may be located inside the case 180.

First, the cap assembly 190 may include the cap plate 191 shaped of a plate. That is, the cap plate 191 is made of a thin plate material and is coupled to the opening of the case 180 to then seal the opening. In addition, the cap plate 191 includes an electrolyte injection hole 192 for injecting an electrolyte into the sealed case 180. Once the electrolyte is injected, the electrolyte injection hole 192 is sealed by a sealing plug 193. In addition, the cap plate 191 includes a vent hole 194, and a vent plate 195, which breaks when an internal pressure of the sealed case 180 is greater than or equal to a preset pressure level, is installed in the vent hole 194.

Figure 5A:
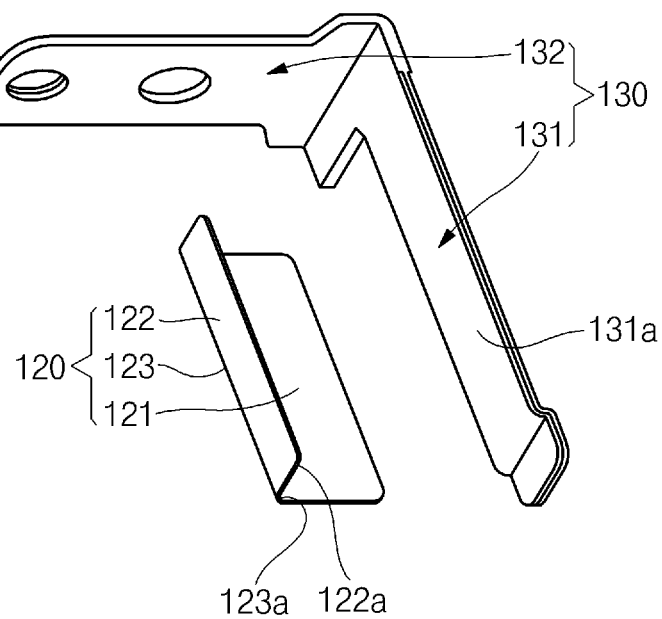
FIGS. 5A and 5B are a perspective view and an exploded perspective view of a current collecting portion and an auxiliary tab during manufacture of the secondary battery shown in FIG. 1.
Figure 5B:
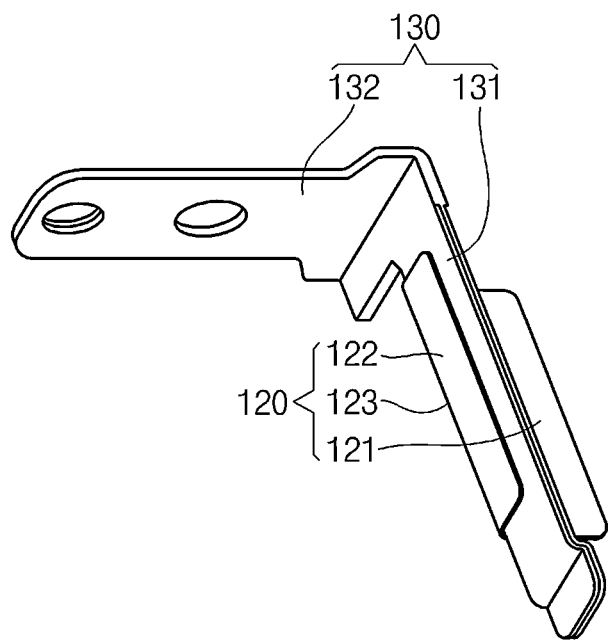

Referring to FIG. 5A, a perspective view illustrating a current collecting portion and an auxiliary tab during manufacture of the secondary battery shown in FIG. 1 is illustrated, and referring to FIG. 5B, an exploded perspective view after welding between the current collecting portion and the auxiliary tab is illustrated.

Hereinafter, welding between the auxiliary tab 120 and the current collecting portion 130 will be described with reference to FIGS. 5A and 5B. Here, the auxiliary tab 120 refers to the first auxiliary tab 120, and the current collecting portion 130 refers to the first current collecting portion 130, which may be equally applied to the second auxiliary tab 150 and the second current collecting portion 160.

First, the auxiliary tab 120 may be formed by bending a single flat rectangular plate by 90 degrees. The auxiliary tab 120 may include a bending portion 123 provided along a longitudinal direction, and a tab connection portion 121 and a current collecting connection portion 122 may be positioned at opposite sides of the bending portion 123. The auxiliary tab 120 may have a bending portion 123 bent 90 degrees, so that the tab connection portion 121 and the current collecting connection portion 122 may become perpendicular to each other around the bending portion 123.

In addition, the current collecting portion 130 may be formed by bending a single plate. The current collecting portion 130 includes an electrode connection portion 131 and a terminal connection portion 132 bent and extended from a top end of the first electrode connection portion 131. A width of the electrode connection portion 131 may be smaller than that of the terminal connection portion 132. The electrode connection portion 131 may be provided at only one side around the center line of the width of the electrode connection portion 131 extending from the terminal connection portion 132. This is for the purpose of facilitating welding between the electrode connection portion 131 of the current collecting portion 130 through electrode tabs 114 and 115 located at the center of the width direction of the electrode assembly 110 and the auxiliary tab 120. The electrode connection portion 131 of the current collecting portion 130 may be longer than the current collecting connection portion 122 of the auxiliary tab 120. That is, the current collecting connection portion 122 of the auxiliary tab 120 may be welded so as to surround only a portion of the electrode connection portion 131 of the current collecting portion 130.

In a state in which the current collecting connection portion 122 of the auxiliary tab 120 is in contact with the electrode connection portion 131 of the current collecting portion 130, the auxiliary tab 120 and the current collecting portion 130 may be welded and coupled to each other. Here, the bending portion 123 may be maintained in close contact with one side surface of the electrode connection portion 131. That is, in a state in which an inner surface 123*a* of the bending portion 123 of the auxiliary tab 120 is in contact with one side surface of the electrode connection portion 131 and an inner surface 122*a* of the current collecting connection portion 122 is in contact with an inner surface 131*a* of the electrode connection portion 131, the auxiliary tab 120 and the current collecting portion 130 may be welded to each other. The current collecting connection portion 122 may be coupled to the electrode connection portion 131 by laser welding, thereby improving safety while reducing welding failures that may be generated during ultrasonic welding.

Figure 6:
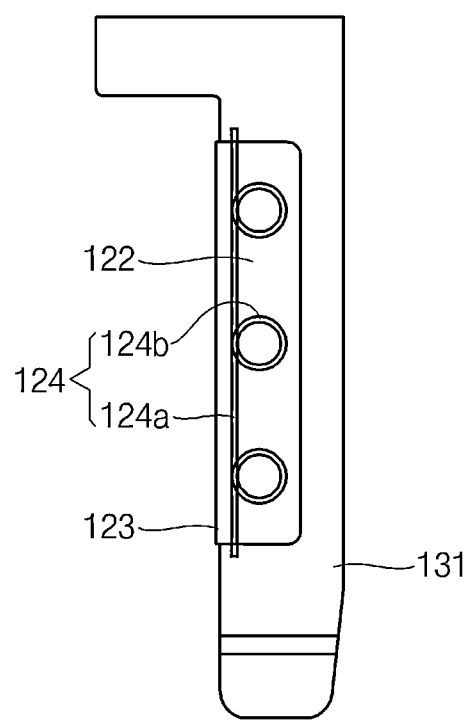
FIG. 6 is an example enlarged view of a welding portion of the current collecting portion and the auxiliary tab shown in FIG. 5B.

FIG. 6 shows an example enlarged view of a welding portion between the current collecting portion and the auxiliary tab shown in FIG. 5B. Hereinafter, laser welding between the current collecting connection portion 122 and the electrode connection portion 131 will be described.

Preferably, a laser welding portion 124 for coupling the current collecting connection portion 122 and the electrode connection portion 131 may include a linear welding portion 124*a* shaped of a straight line, spaced a predetermined distance apart from the bending portion 123 of the auxiliary tab 120, and a circular welding portion 124*b* shaped of a circle, having an end portion overlapped with the linear welding portion 124*a*. Here, the linear welding portion 124*a* may be spaced at least a distance of about 0.8 mm to about 1.2 mm apart from the bending portion 123. Preferably, when the electrode tabs 114 and 115 have a thickness of about 0.4 mm to about 0.5 mm, the linear welding portion 124*a* may be spaced at least a distance of about 0.8 mm to about 1.2 mm apart from the bending portion 123.

Figure 7:
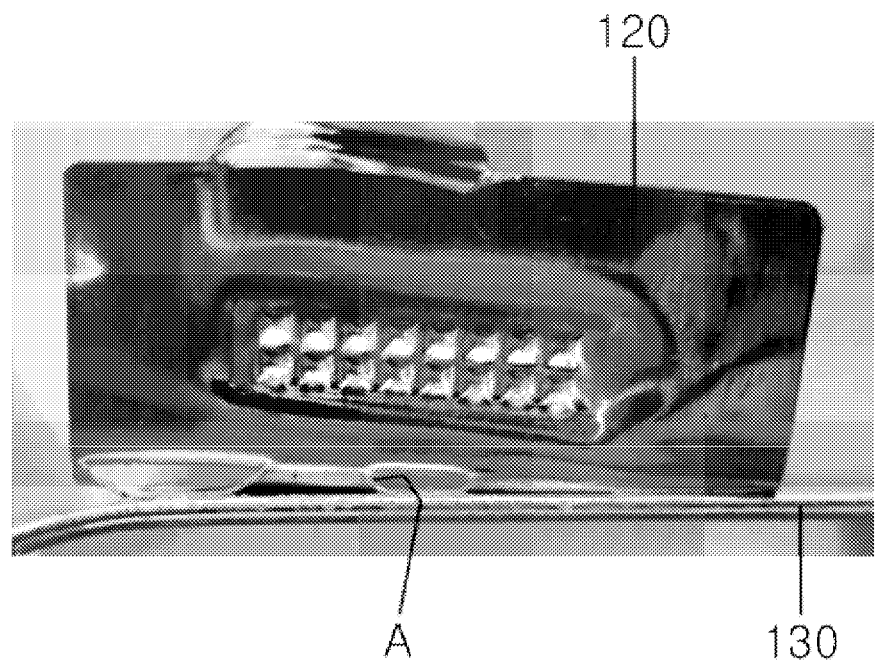
FIG. 7 shows a result of rupturing between the auxiliary tab and the current collecting portion.

When the linear welding portion 124*a* is spaced less than 0.8 mm apart from the bending portion 123, breaking or rupturing may occur between the current collecting connection portion 122 and the electrode connection portion 131, as indicated by A shown in FIG. 7, due to fatigue loading (vibration energy) generated when the auxiliary tab 120 and the electrode tabs 114 and 115 are ultrasonically welded. As such, as the linear welding portion 124*a* is located closer to the bending portion 123, the rupture between the auxiliary tab 120 and the current collecting portion 130 may be more severely generated during ultrasonic welding between the auxiliary tab 120 and the electrode tabs 114 and 115.

Figure 8:
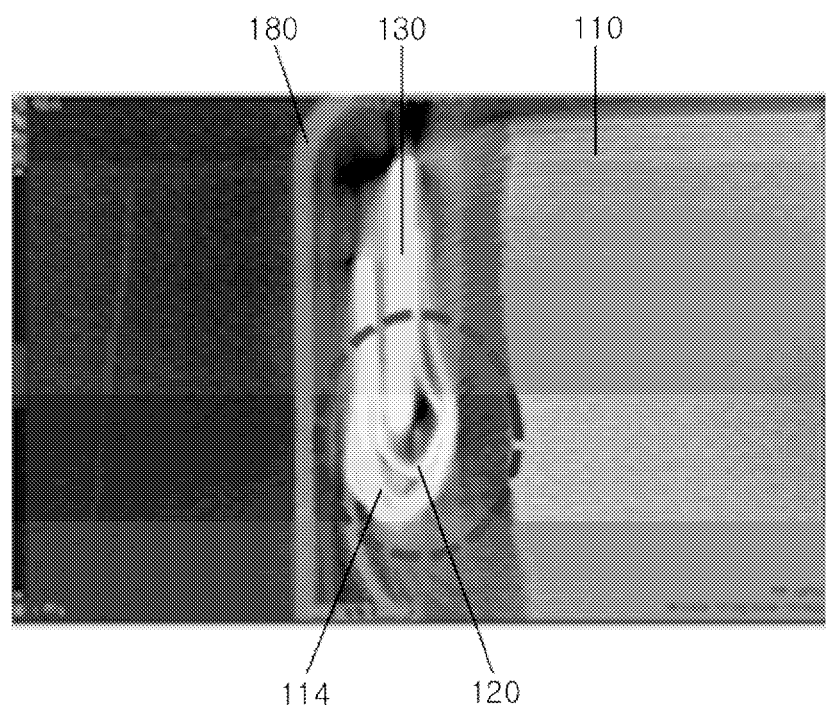
FIG. 8 is a result of pressing of an electrode plate, which may occur when the auxiliary tab is bent.

In addition, when the linear welding portion 124*a* is spaced greater than 1.2 mm apart from the bending portion 123, the auxiliary tab 120 may be lifted during bending of the auxiliary tab 120 and the electrode assembly 110 after the auxiliary tab 120 and the electrode tabs 114 and 115 are ultrasonically welded, rather than being bent along with the electrode connection portion 131 in a close contact therewith, as shown in FIG. 8, and thus an electrode-plate-pressing phenomenon in which the electrode tabs 114 and 115 are pressed may occur.

In addition, when the electrode tabs 114 and 115 have a thickness of about 0.5 mm to about 0.7 mm, the linear welding portion 124*a* may be spaced apart from the bending portion 123 by a distance of about 1.2 mm to about 1.8 mm. Here, when the linear welding portion 124*a* is spaced less than 1.2 mm apart from the bending portion 123, rupturing may occur between the current collecting connection portion 122 and the electrode connection portion 131, as indicated by A shown in FIG. 7, due to fatigue loading (vibration energy) generated during ultrasonic welding between the auxiliary tab 120 and the electrode tabs 114 and 115. In addition, when the linear welding portion 124*a* is spaced greater than 1.8 mm apart from the bending portion 123, the auxiliary tab 120 may be lifted during bending of the auxiliary tab 120 and the electrode assembly 110 after the auxiliary tab 120 and the electrode tabs 114 and 115 are ultrasonically welded, rather than being bent along with the electrode connection portion 131 in a close contact therewith, as shown in FIG. 8, and thus an electrode-plate-pressing phenomenon in which the electrode tabs 114 and 115 are pressed may occur.

That is, the linear welding portion 124*a* may be varied according to the thicknesses of the electrode tabs 114 and 115 of the electrode assembly 110, which is for the purpose of preventing rupturing or an electrode-plate-pressing phenomenon during bending after the auxiliary tab 120 and the electrode tabs 114 and 115 are welded.

In addition, the circular welding portion 124*b* may be positioned within the current collecting connection portion 122 of the auxiliary tab 120, and one end portion of one side of the circular welding portion 124*b* may be brought into contact with the linear welding portion 124*a*. Here, the welding time of the laser welding portion 124, that is, the linear welding portion 124*a* and the circular welding portion 124*b*, may be any one in a range of about 0.2 seconds to about 0.3 seconds. In addition, the laser welding amplitude of the laser welding portion 124, that is, the linear welding portion 124*a* and the circular welding portion 124*b*, may be any one in a range of about 40 μm to about 50 μm.

In addition, while three circular welding portions 124 are shown in FIG. 6, the present invention does not limit the number of circular welding portions 124 thereto. However, a distance between each of the circular welding portions 124*b* may be at least about 1.0 mm.

In addition, the linear welding portion 124*a* may extend longer than the current collecting connection portion 122. Preferably, the start and end points of the linear welding portion 124*a* may be located in the electrode connection portion 131 of the current collecting portion 130. This enables uniform welding of the linear welding portion 124*a* such that the start and the end points of the linear welding portion 124*a* are made to be located in the electrode connection portion 131 of the current collecting portion 130.

Figure 9:
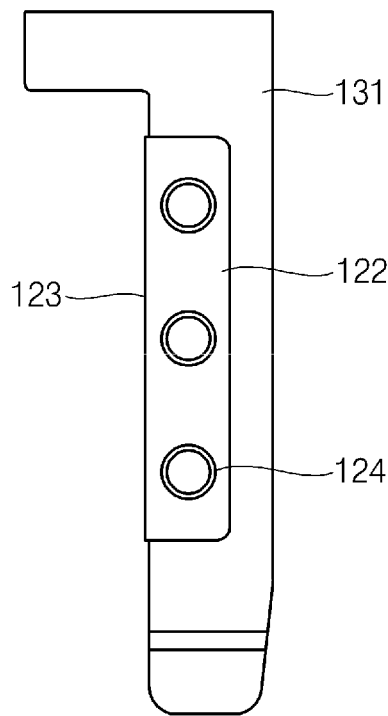
FIG. 9 is another example enlarged view of a welding portion of the current collecting portion and the auxiliary tab shown in FIG. 5B.

FIG. 9 shows another example enlarged view of a welding portion between the current collecting portion and the auxiliary tab shown in FIG. 5B. Hereinafter, another example laser welding between the current collecting connection portion 122 and the electrode connection portion 131 will be described with reference to FIG. 9.

Preferably, the laser welding portions 124 for coupling the current collecting connection portion 122 and the electrode connection portion 131 to each other may include circular welding portions 124 spaced a predetermined distance apart from the bending portion 123 of the auxiliary tab 120.

In addition, the circular welding portions 124 may be located within the current collecting connection portion 122 of the auxiliary tab 120. Here, the welding time of the circular welding portions 124 may be any one in a range of about 0.3 seconds to about 0.4 seconds. In addition, the laser welding amplitude of the circular welding portions 124 may be any one in a range of about 40 μm to about 50 μm. As such, when the current collecting connection portion 122 of the auxiliary tab 120 and the electrode connection portion 131 of the current collecting portion 130 are welded only through the circular welding portions 124, without a linear welding portion, the welding time and the welding amplitude may be increased, thereby achieving strong welding.

In addition, since welding is performed only through the circular welding portions 124, the circular welding portions 124 may be spaced at least a distance of about 1.5 mm to about 1.8 mm apart from the bending portion 123 to prevent rupturing due to fatigue loading (vibration energy) generated when the auxiliary tab 120 and the electrode tabs 114 and 115 are ultrasonically welded. That is, when welding is performed only through the circular welding portions 124, in order to prevent rupturing due to fatigue loading generated during ultrasonic welding, the circular welding portions 124 are preferably spaced a relatively large distance apart from the bending portion 123, compared to when a linear welding portion is provided.

Here, when the circular welding portions 124 are spaced less than 1.5 mm apart from the bending portion 123, rupturing may occur between the current collecting connection portion 122 and the electrode connection portion 131 due to fatigue loading (vibration energy) generated during ultrasonic welding between the auxiliary tab 120 and the electrode tabs 114 and 115, as indicated by A shown in FIG. 7. In addition, when the circular welding portions 124 are spaced greater than 1.8 mm apart from the bending portion 123, the auxiliary tab 120 may be lifted during bending of the auxiliary tab 120 and the electrode assembly 110 after the auxiliary tab 120 and the electrode tabs 114 and 115 are ultrasonically welded, as shown in FIG. 8, and thus an electrode-plate-pressing phenomenon in which the electrode tabs 114 and 115 are pressed may occur.

Figure 10:
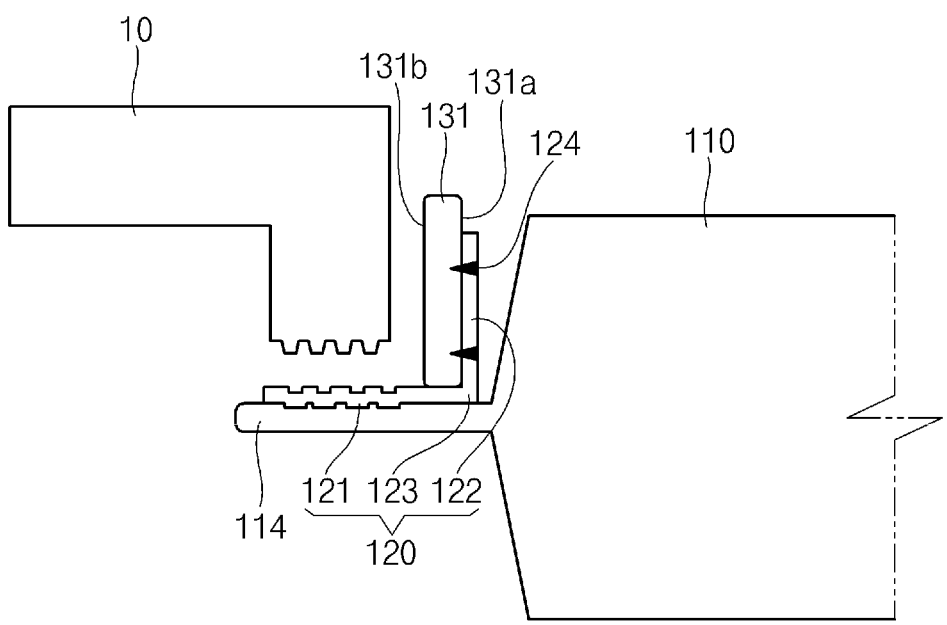
FIG. 10 is a still another example enlarged view of a welding portion of the current collecting portion and the auxiliary tab shown in FIG. 5B.

Referring to FIG. 10, an example ultrasonic welding between the auxiliary tab and the electrode tab during the manufacturing process of the secondary battery shown in FIG. 1. Hereinafter, welding between the current collecting connection portion 122 and the electrode connection portion 131 will be described with reference to FIG. 10. Here, the auxiliary tab 120 refers to a first auxiliary tab 120, and the electrode tab 114 refers to a first electrode tab 114, which may be equally applied to the second auxiliary tab 150 and the second electrode tab 115.

After the auxiliary tab 120 and the current collecting portion 130 are laser-welded, the tab connection portion 121 and the electrode tab 114 may be coupled to each other by ultrasonic welding due to the pressure and vibration applied from an ultrasonic welding horn 10 in a state in which one-side surfaces of the tab connection portion 121 of the auxiliary tab 120 and the electrode tab 114 are in contact with each other. Here, the ultrasonic welding horn 10 may perform welding in a direction from the tab connection portion 121 of the auxiliary tab 120 to the electrode tab 114. In order to prevent the electrode tab 114 that is a thin film from being damaged, the tab connection portion 121 and the electrode tab 114 may be ultrasonically welded in a state in which the ultrasonic welding horn 10 is located at a side of the tab connection portion 121 of the auxiliary tab 120 that is a single plate. Here, a side surface of the electrode assembly 110, from which the electrode tab 114 protrudes, may be located adjacent to the current collecting connection portion 122.

In addition, after the tab connection portion 121 and the electrode tab 114 are coupled to each other by ultrasonic welding, the tab connection portion 121 and the electrode tab 114 may be bent toward the electrode connection portion 131 of the current collecting portion 130. Here, the tab connection portion 121 and the electrode tab 114 may be bent toward the electrode connection portion 131 so as to be brought into contact with an outer surface 131b of the inner surface 131a of the electrode connection portion 131 welded to the current collecting connection portion 122. That is, the electrode connection portion 131 of the current collecting portion 130 may be positioned between the current collecting connection portion 122 of the auxiliary tab 120 and the tab connection portion 121. In addition, the bending portion 123 of the auxiliary tab 120 is bent 180 degrees, so that the current collecting connection portion 122 and the tab connection portion 121 may become parallel to each other. That is, the auxiliary tab 120 may be bent in a "U" shape by the bending portion 123.

In the secondary battery 100, an auxiliary tab made of a single plate and a current collecting portion are strongly laser-welded, thereby preventing damage due to fatigue loading that may be generated when an electrode tab and the auxiliary tab are ultrasonically welded. In addition, the secondary battery 100 includes an auxiliary tab made of a flexible rigid material, thereby preventing a welding portion of the electrode tab and the auxiliary tab from being broken during bending after the electrode tab and the auxiliary tab are welded to each other.

While the foregoing embodiment has been described to practice the secondary battery and the method for manufacturing same according to the present invention, it will be understood by those of ordinary skill in the art that various changes in form and details may be made therein without departing from the spirit and scope of the present disclosure as defined by the following claims.

INDUSTRIAL APPLICABILITY

Various embodiments of the present invention relate to a secondary battery and a method for manufacturing same.

The invention claimed is:
1. A secondary battery comprises:
an electrode assembly having an electrode tab;
an auxiliary tab which is a metal single plate mechanically and electrically coupled to the electrode tab; and
a current collecting portion which is mechanically and electrically coupled to the auxiliary tab,
wherein the auxiliary tab comprises:
a tab connection portion welded to the electrode tab;
a current collecting connection portion welded to the current collecting portion and disposed parallel to the tab connection portion; and
a bending portion which connects between the tab connection portion and the current collecting connection portion and is on one side of the current collecting portion,
wherein the auxiliary tab has an exterior surface facing away from the electrode assembly, and the electrode tab is on the exterior surface.

2. The secondary battery of claim 1, wherein the current collecting connection portion has a laser welding portion coupled to the current collecting portion by laser welding.

3. The secondary battery of claim 2, wherein the laser welding portion comprises:
a linear welding portion shaped of a straight line, spaced a predetermined distance apart from the bending portion; and
a circular welding portion shaped of a circle, having an end portion overlapped with the linear welding portion.

4. The secondary battery of claim 3, wherein when the electrode tab has a thickness of about 0.4 mm to about 0.5 mm, the linear welding portion is spaced at least a distance of about 0.8 mm to about 1.2 mm apart from the bending portion.

5. The secondary battery of claim 3, wherein when the electrode tab has a thickness of about 0.5 mm to about 0.7 mm, the linear welding portion is spaced at least a distance of about 1.2 mm to about 1.8 mm apart from the bending portion.

6. The secondary battery of claim 3, wherein a length of the linear welding portion is larger than that of the current collecting connection portion, and start and end points of the linear welding portion are positioned in the current collecting portion.

7. The secondary battery of claim 2, wherein the laser welding portion is a circular welding portion shaped of a circle, spaced at least a distance of about 1.5 mm to about 1.8 mm apart from the bending portion.

8. The secondary battery of claim 1, wherein the auxiliary tab is made of 1050-O aluminum or 1100-0 copper having high stiffness and elongation.

9. The secondary battery of claim 1, wherein the auxiliary tab has an interior surface facing toward the current collecting portion, and the current collecting portion is on the interior surface between the tab connection portion and the current collecting connection portion.

10. A secondary battery comprises:
an electrode assembly having an electrode tab;
an auxiliary tab which is a metal single plate mechanically and electrically coupled to the electrode tab; and
a current collecting portion which is mechanically and electrically coupled to the auxiliary tab,
wherein the auxiliary tab comprises:
a tab connection portion welded to the electrode tab;
a current collecting connection portion welded to the current collecting portion and disposed parallel to the tab connection portion; and
a bending portion which connects between the tab connection portion and the current collecting connection portion and is on one side of the current collecting portion,
wherein the bending portion is located between the current collecting portion and the electrode tab, and
wherein a portion of the current collecting portion welded to the current collecting connection portion is located between the tab connection portion and the current collecting connection portion.

11. The secondary battery of claim 10, wherein the current collecting connection portion has a laser welding portion coupled to the current collecting portion by laser welding.

12. The secondary battery of claim 11, wherein the laser welding portion comprises:
a linear welding portion shaped of a straight line, spaced a predetermined distance apart from the bending portion; and
a circular welding portion shaped of a circle, having an end portion overlapped with the linear welding portion.

13. The secondary battery of claim 12, wherein when the electrode tab has a thickness of about 0.4 mm to about 0.5 mm, the linear welding portion is spaced at least a distance of about 0.8 mm to about 1.2 mm apart from the bending portion.

14. The secondary battery of claim 12, wherein a length of the linear welding portion is larger than that of the current collecting connection portion, and start and end points of the linear welding portion are positioned in the current collecting portion.

15. The secondary battery of claim 11, wherein the laser welding portion is a circular welding portion shaped of a circle, spaced at least a distance of about 1.5 mm to about 1.8 mm apart from the bending portion.

16. The secondary battery of claim 10, wherein the auxiliary tab is made of 1050-O aluminum or 1100-O copper having high stiffness and elongation.

17. The secondary battery of claim 1, wherein the auxiliary tab comprises:
an interior surface facing toward the current collecting portion; and,
an exterior surface being opposite to the interior surface,
wherein the current collecting portion is on the interior surface between the the tab connection portion and the current collecting connection portion, and
wherein the electrode tab is on the exterior surface of the tab connection portion.

* * * * *

UNITED STATES PATENT AND TRADEMARK OFFICE
CERTIFICATE OF CORRECTION

| | | |
|---|---|---|
| PATENT NO. | : 12,263,536 B2 | Page 1 of 1 |
| APPLICATION NO. | : 17/298485 | |
| DATED | : April 1, 2025 | |
| INVENTOR(S) | : Ho Jun Shin et al. | |

It is certified that error appears in the above-identified patent and that said Letters Patent is hereby corrected as shown below:

In the Drawings

In Sheet 2 of 6, in Fig. 2B, Reference numeral 150, Line 2, delete "153" and insert -- 151 --.

In the Claims

In Column 15, Line 19, in Claim 8, delete "1100-0" and insert -- 1100-O --.

In Column 16, Line 38, in Claim 17, delete "the the" and insert -- the --.

Signed and Sealed this
Twenty-ninth Day of July, 2025

Coke Morgan Stewart
*Acting Director of the United States Patent and Trademark Office*